United States Patent
Wilkinson et al.

(10) Patent No.: US 9,628,469 B2
(45) Date of Patent: *Apr. 18, 2017

(54) SINGLE SIGN ON FOR A REMOTE USER SESSION

(71) Applicant: VMware, Inc., Palo Alto, CA (US)

(72) Inventors: Anthony J. Wilkinson, Princess Risborough (GB); Per Olov Larsson, London (GB); Ashley Nuttall, Farnham (GB); Hans Christenson, Huddinge (SE); Tom Elliott, New York, NY (US); Steven Sigel, North Andover, MA (US); Adam Gross, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/587,923

(22) Filed: Dec. 31, 2014

(65) Prior Publication Data

US 2015/0200932 A1    Jul. 16, 2015

Related U.S. Application Data

(63) Continuation of application No. 12/939,817, filed on Nov. 4, 2010, now Pat. No. 8,955,072.
(Continued)

(51) Int. Cl.
*H04L 29/06* (2006.01)
*H04L 9/32* (2006.01)
(Continued)

(52) U.S. Cl.
CPC ........ *H04L 63/0815* (2013.01); *G06F 21/335* (2013.01); *G06F 21/34* (2013.01);
(Continued)

(58) Field of Classification Search
CPC ...... G06F 21/335; G06F 21/41; G06F 21/445; H04L 63/0815; H04L 63/0807;
(Continued)

(56) References Cited

U.S. PATENT DOCUMENTS

| 8,112,789 B2* | 2/2012 | Halls | G06F 21/33 726/10 |
| 8,176,538 B2* | 5/2012 | Kigo | G06F 21/41 713/170 |

(Continued)

FOREIGN PATENT DOCUMENTS

| EP | 1089516 A2 | 4/2001 |
| WO | 2009018564 A1 | 2/2009 |

OTHER PUBLICATIONS

Notification of Transmittal of the International Search Report and the Written Opinion of teh International Searching Authority, or the Declaration, Korean Intellectual Property Office, dated Jun. 24, 2011.

(Continued)

*Primary Examiner* — Linglan Edwards

(57) ABSTRACT

A user accesses a remote session, the connection to which is managed by a connection broker, according to a single sign-on (SSO) process. The SSO process includes the user entering his or her credentials and being authenticated to the connection broker. In addition to user authentication, the SSO process includes connection broker authentication to confirm that the connection broker is trustworthy. When the connection broker is authenticated, the user credentials are transmitted to the connection broker in a secure manner and the connection broker forwards them onto a machine hosting the remote session so that the user can be logged into the remote session without entering his or her credentials again.

18 Claims, 4 Drawing Sheets

Related U.S. Application Data

(60) Provisional application No. 61/258,367, filed on Nov. 5, 2009.

(51) Int. Cl.
*G06F 21/44* (2013.01)
*G06F 21/33* (2013.01)
*G06F 21/34* (2013.01)
*G06F 21/41* (2013.01)
*G06F 9/455* (2006.01)

(52) U.S. Cl.
CPC ............ *G06F 21/41* (2013.01); *G06F 21/445* (2013.01); *H04L 9/3226* (2013.01); *H04L 9/3234* (2013.01); *H04L 9/3263* (2013.01); *H04L 9/3273* (2013.01); *G06F 2009/45587* (2013.01); *H04L 63/0807* (2013.01); *H04L 63/0884* (2013.01); *H04L 2209/56* (2013.01)

(58) Field of Classification Search
CPC . H04L 63/0884; H04L 9/3226; H04L 9/3234; H04L 9/3273
See application file for complete search history.

(56) References Cited

U.S. PATENT DOCUMENTS

| | | | | |
|---|---|---|---|---|
| 8,196,193 B2* | 6/2012 | Hoey | ............... | G06F 21/33 380/279 |
| 8,255,984 B1* | 8/2012 | Ghostine | ............... | G06F 21/41 709/217 |
| 8,296,828 B2* | 10/2012 | Dalzell | ............... | G06F 21/41 713/168 |
| 2003/0046534 A1* | 3/2003 | Alldredge | ............... | G06Q 20/02 713/153 |
| 2003/0079028 A1* | 4/2003 | Kortum | ............... | H04L 63/0272 709/229 |
| 2004/0167881 A1* | 8/2004 | Masuda | ............... | H04L 69/329 |
| 2005/0091171 A1 | 4/2005 | Grobman | | |
| 2005/0091388 A1* | 4/2005 | Kamboh | ............... | H04L 12/2856 709/228 |
| 2006/0230438 A1* | 10/2006 | Shappir | ............... | G06F 21/335 726/8 |
| 2008/0196090 A1* | 8/2008 | Baron | ............... | H04L 9/321 726/5 |
| 2008/0263629 A1 | 10/2008 | Anderson | | |
| 2008/0320553 A1* | 12/2008 | Balay | ............... | H04L 63/102 726/1 |
| 2009/0210934 A1 | 8/2009 | Innes | | |
| 2009/0249439 A1 | 10/2009 | Olden et al. | | |
| 2010/0050251 A1* | 2/2010 | Speyer | ............... | G06Q 10/06 726/20 |
| 2010/0146611 A1* | 6/2010 | Kuzin | ............... | H04L 63/0815 726/8 |
| 2010/0306668 A1 | 12/2010 | Williams, III et al. | | |

OTHER PUBLICATIONS

European Examination Report Applicaiton No. 10829050.3 date Apr. 20, 2016, consists of 7 pages.

Vmware Virtual et al. "Technical Note VMware Virtual Desktop Manager User Authentication Guide" May 27, 2008.

European Examination Report Applicaiton No. 10 829 050.3 date Oct. 24, 2016, consists of 7 pages.

* cited by examiner

SINGLE SIGN ON FOR A REMOTE USER SESSION

CROSS-REFERENCE TO RELATED APPLICATION(S)

This application is a continuation of, and claims the benefit of, U.S. patent application Ser. No. 12/939,817 filed Nov. 4, 2010 entitled "Single Sign on for a Remote User Session," which claims the benefit of U.S. Provisional Patent Application No. 61/258,367, filed Nov. 5, 2009 and entitled "Single Sign On for a Remote User Session," each of which are incorporated by reference herein.

BACKGROUND

Modern computing systems provide various methods for user authentication. A common authentication technique only has a password requirement: The user enters his or her user identifier, and then a secret password that only the user knows. This is referred to as single-factor authentication, since it only relies on what the user knows. More secure authentication regimes, such as multiple-factor authentication, require, in addition to what the user knows, verification of what the user is or does (e.g., fingerprint or retinal scan) or verification of something the user has, e.g., a token or smart card.

Smart cards provide a way to authenticate a user that is different than normal password authentication. With smart card authentication, a user inserts a smart card into a smart card reader and enters a personal identification number (PIN). When a correct PIN is entered, one or more certificates that are on stored in the smart card are used to authenticate the user. This type of authentication provides two-factor authentication by verifying both what they have on them (the smart card and the certificates stored therein) and what they know (the smart card PIN).

In computing systems that permit remote user sessions, a user may be authenticated multiple times before the user is granted access to a remote user session, and may need to enter his or her credentials each time. For example, in computing systems that permit users to access their desktops remotely using local client devices, the user enters his or her credentials to be authenticated by his or her local client device, and then enters another set of credentials to be authenticated by the machine that is hosting the user's desktop. In some configurations, a connection broker may be disposed between the local client device and the machine that is hosting the user's desktop, requiring the user to enter yet another set of credentials to be authenticated by the connection broker.

In view of the inconvenience of repeatedly entering user credentials for access to different services, an authentication protocol known as Kerberos is adopted in certain conventional systems. In such systems, initial sign-on prompts the user for his or her credentials. Using these credentials, a Kerberos ticket-granting ticket is generated. For each of the services required for access, a service ticket, which includes the user's identity, is generated from the Kerberos ticket-granting ticket. When accessing the service, the user simply presents the service ticket to the service instead of re-entering his or her user credentials. This technique, however, is inadequate to authenticate the user for a remote desktop session, because the ticket only confirms the user's identity. Upon being granted access to the machine hosting the remote desktop session, the user has to enter his or her password to get signed onto the remote desktop session.

SUMMARY

One or more embodiments of the present invention provide a single sign-on (SSO) authentication method and system, in which a user, when accessing a service running on a resource managed by a connection broker, enters his or her user credentials just one time to be authenticated by the connection broker and signed onto the service. According to one embodiment, the single sign-on is achieved by performing an authentication of the connection broker that is managing the connection to the resource hosting the service to confirm that the connection broker is trustworthy, securely transmitting the user credentials to the connection broker after such authentication, and having the connection broker forward the user credentials to the resource hosting the service so that the user can be automatically signed onto the resource without having to re-enter the user credentials.

A method of authenticating a user to a service in a system having a connection broker that manages connections to the service, includes the steps of receiving an input of credentials of the user at a client computing device that communicates with the connection broker and the service over a network, the user credentials including a secret component, authenticating the user, authenticating the connection broker, transmitting the secret component of the user credentials from the client computing device to the authenticated broker in a secure manner, forwarding the secret component of the user credentials from the authenticated broker to the service, and authenticating the user to the service using the secret component of the user credentials forwarded by the authenticated broker.

A computer system configured to support single sign-on access, according to an embodiment of the present invention, includes one or more server computers in which virtual machines are running, a connection broker for managing access to the virtual machines, and a domain controller for authenticating users to the connection broker and the connection broker to the users. In this embodiment, the connection broker that is authenticated to a user receives a secret user credential from the user in a secure manner and forwards the secret user credential to the virtual machine that is running a desktop of the user, and the virtual machine grants the user access to the desktop of the user based on the secret user credential forwarded by the connection broker.

Further embodiments of the present invention include a non-transitory computer readable storage medium that includes instructions that enable a processing unit to implement one or more aspects of the above method, as well as a computer system configured to implement one or more aspects of the above method.

DETAILED DESCRIPTION

Figure 1:
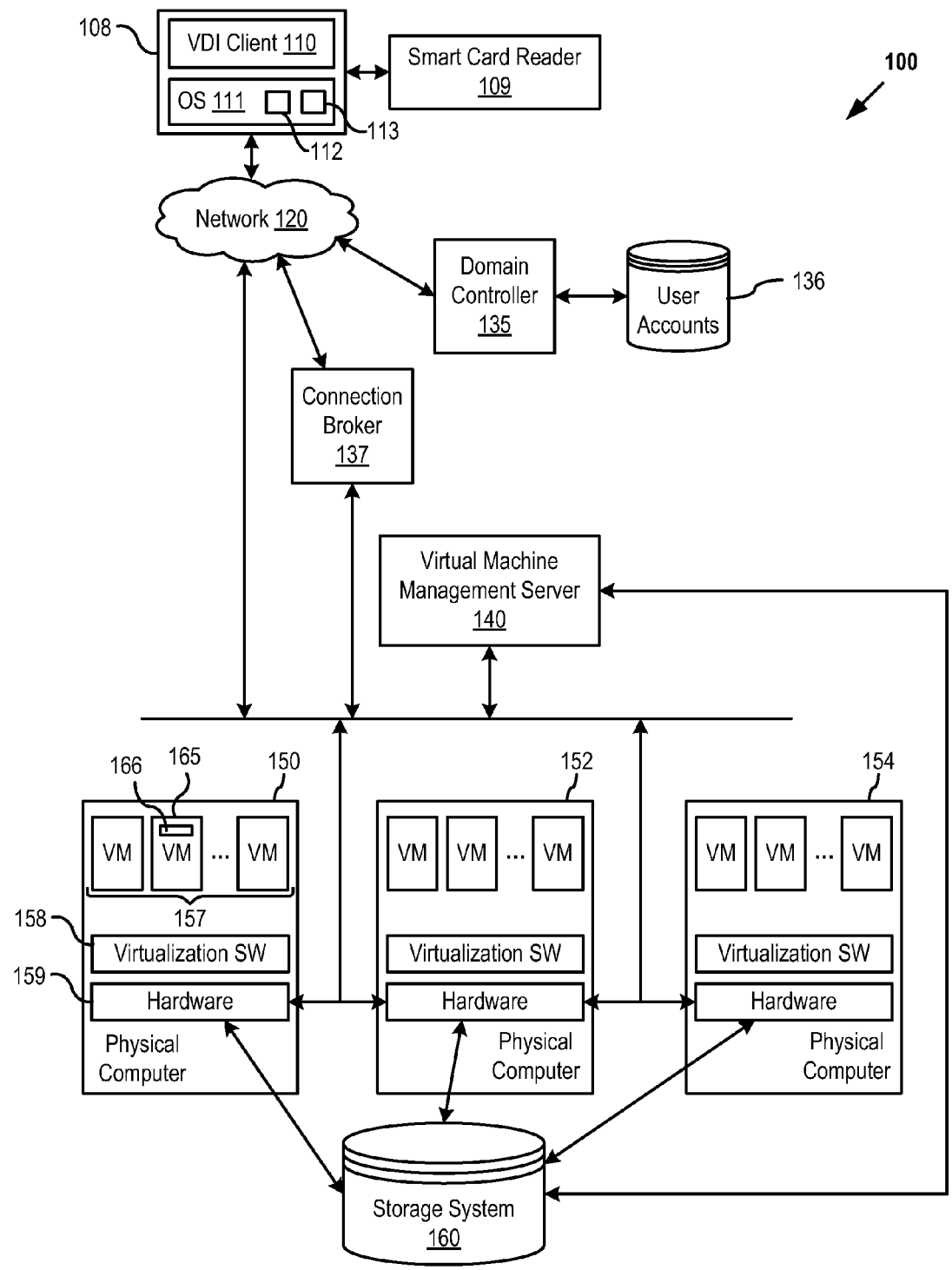
FIG. 1 illustrates components of a virtualized desktop infrastructure system in which one or more embodiments of the present invention may be implemented.

FIG. 1 illustrates components of a virtualized desktop infrastructure (VDI) system 100 in which one or more embodiments of the present invention may be implemented. In VDI system 100, VDI client software programs (also referred to as "VDI clients" for short), e.g., VDI client 110, run on operating systems of local computing devices, e.g., client machine 108 on top of an operating system (OS) 111. VDI clients provides an interface for the users to access their desktops, which may be running in one of virtual machines 157 or blade server (not shown) in a data center that is remote from the user locations. The term, "desktop" refers to the instance of an interactive operating environment provided by a computer operating system and software applications, typically in the form of a display and sound output and keyboard and mouse input. With VDI clients, users can access desktops running in a remote data center through network 120, from any location, using a general purpose computer running a commodity operating system and a VDI client software program such as VMware® View™, or a special purpose thin client such as those available from Dell, HP, NEC, Sun Microsystems, Wyse, and others.

VDI system 100 includes a domain controller 135, such as Microsoft® Active Directory®, that manages user accounts 136 including user log-in information, and a connection broker 137 that manages connections between VDI clients and desktops running in virtual machines 157 or other platforms. Domain controller 135 and connection broker 137 may run on separate servers or in separate virtual machines running on the same server or different servers. In the embodiments of the present invention illustrated herein, desktops are running in virtual machines 157 and virtual machines 157 are instantiated on a plurality of physical computers 150, 152, 154, each of which includes virtualization software 158 and hardware 159, is controlled by a virtual machine management server 140, and is coupled to a shared persistent storage system 160.

All of the components of VDI system 100 communicate via network 120. For simplicity, a single network is shown but it should be recognized that, in actual implementations, the components of VDI system 100 may be connected over the same network or different networks. Furthermore, a particular configuration of the virtualized desktop infrastructure is described above and illustrated in FIG. 1, but it should be recognized that one or more embodiments of the present invention may be practiced with other configurations of the virtualized desktop infrastructure.

In the embodiments of the present invention described herein, user credentials that are used for single sign on may be user ID and password when password authentication is used, and user principal name on a smart card certificate and a smart card PIN when smart card authentication is used. In the smart card embodiment, a smart card reader 109 is connected to client machine 108, and when the user's smart card is inserted into smart card reader 109, a user interface for inputting a smart card PIN is displayed to the user. Client machine 108 gains access to the certificates stored in the smart card only when the correct smart card PIN is entered.

Figure 2:
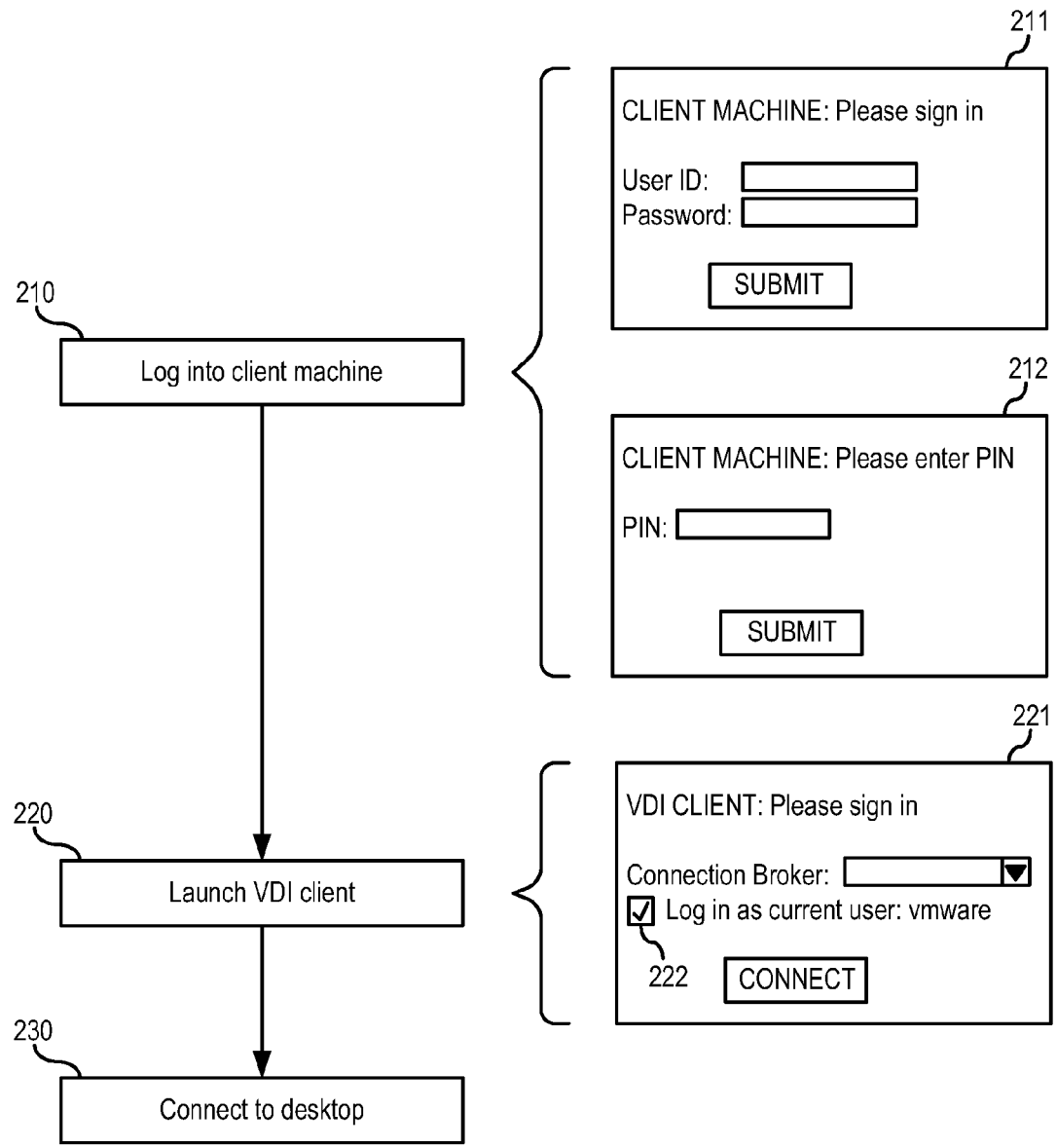
FIG. 2 illustrates the process carried out by a user to sign onto a remote desktop.

The process carried out by a user to sign onto a remote desktop running in one of VMs 157 is illustrated in FIG. 2 and will be described with reference to both FIGS. 1 and 2. At step 210, the user logs into a local client device, such as client machine 108, by entering user ID and password through a user interface 211 displayed on client machine 108, or a smart card PIN through a user interface 212 displayed on client machine 108 in embodiments employing smart card authentication.

Upon successfully logging into client machine 108, at step 220, the user launches VDI client 110, which results in user interface 221 being displayed on client machine 108. User interface 221 includes a checkbox 222 that gives the user the option of "Login as current user" which essentially telling VDI client 110 that the user credentials for logging into client machine 108 should be used as the user credentials for accessing the remote desktop. The administrator of VDI system 100, however, may disable this option for higher security since this option would require storing the user's credentials at client machine 108.

At step 230, the user clicks on "CONNECT" to connect to the connection broker and log into the remote desktop. If checkbox 222 is checked and the user clicks on "CONNECT," the same credentials that were used to log into client machine 108 are used as the credentials for logging into the virtual machine hosting the user's remote desktop and the user is not required to re-enter those credentials. On the other hand, if checkbox 222 is not checked and the user clicks on "CONNECT," a user interface is displayed on client machine 108 prompting the user to input the credentials for logging into the virtual machine hosting the user's remote desktop. Having this option also allows VDI system 100 to use different authentication methods for logging users into client machine 108 and the virtual machine hosting the remote desktop. For example, different user IDs and passwords and different smart cards may be used. In another example, user ID and password may be used for logging into client machine 108 and smart card may be used for logging into the virtual machine hosting the user's remote desktop.

Figure 3:
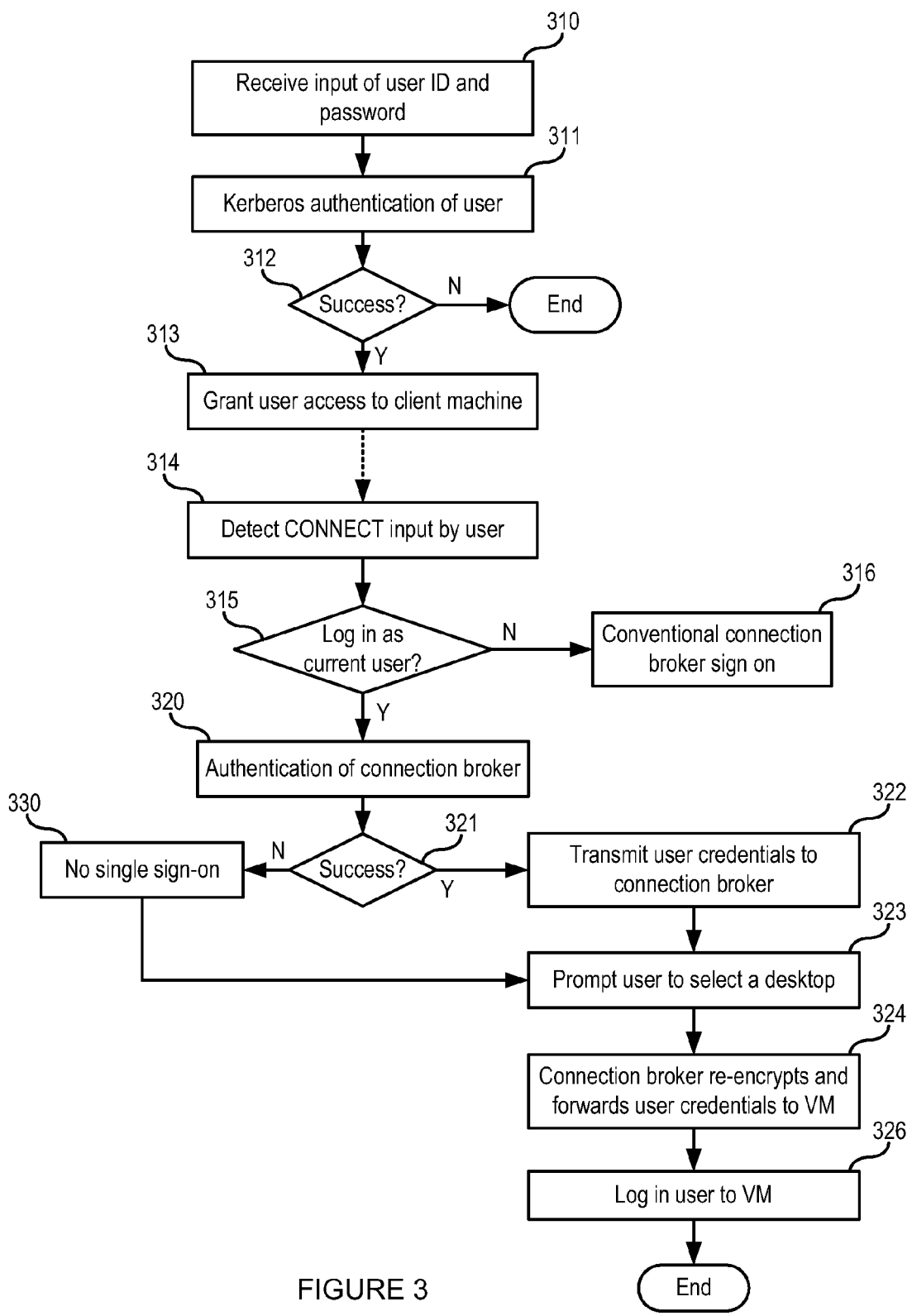
FIG. 3 is a flow diagram that illustrates a single sign-on authentication process according to one or more embodiments of the present invention when user credentials are in the form of user ID and password.

FIG. 3 is a flow diagram that illustrates an SSO authentication process according to one or more embodiments of the present invention when user credentials are in the form of user ID and password. These steps are carried out by various components of VDI system 100, including client machine 108, VDI client 110, domain controller 135, connection broker 137, and virtual machine 165.

The SSO authentication process is initiated when the user enters his or her user credentials, in the form of a user ID and a password, to log into client machine 108. At step 310, client machine 108 receives the input of user ID and password. The user credentials are gathered by a component of OS 111 executing on client machine 108 (shown in FIG. 1 as authentication module 112), and kept safely away from non-administrative applications for security reasons. For example, an "Authentication Package" may be installed for a Microsoft Windows-based client machine 108. The "Authentication Package" stores the user credentials in an internal cache, the contents of which can be retrieved only by holders of a trusted computing base privilege, such as endpoint system service "wsnm," which is shown in FIG. 1 as system service 113.

Step 311 represents Kerberos authentication of the user performed by domain controller 135 using the user ID entered by the user at step 310. Domain controller 135 determines whether or not the user has entered the correct password by exchanging messages with client machine 108 that are encrypted using a hashed version of the password that was registered by the user and is maintained by domain controller 135 in user accounts 136. Using such a technique, the password entered by the user at step 310 is not exchanged between client machine 108 and domain controller 135. At step 312, if it is determined that the user ID and the password that the user entered do not match the registered user ID and password, user authentication fails and the process ends. On the other hand, if there is a match, the user is authenticated by domain controller 135, and user access to client machine 108 is granted (step 313).

The remaining steps shown in FIG. 3 represent the steps carried out after the user has successfully logged into client machine 108, launches VDI client 110, and clicks on "CONNECT." At step 314, VDI client 110 detects that the user has clicked on "CONNECT." Then, prior to connecting to connection broker 137, VDI client 110 determines at step 315 whether or not the user has selected the option of "Log in as current user" by checking checkbox 222. If the user has not, the user logs into connection broker 137 using conventional methods (step 316).

If VDI client 110 determines at step 315 that the user has selected the option of "Log in as current user" by checking checkbox 222, step 320 is carried out, where connection broker 137 is authenticated. This authentication step has two parts and the second part is optional. The first part is Kerberos authentication using an ID of connection broker 137 that has been previously registered with domain controller 135. The first part essentially authenticates connection broker 137 to system service 113 to ensure that connection broker 137 can be trusted with the user credentials before system service 113 transmits them to connection broker 137. This prevents malicious software on the client (or elsewhere) querying the credential cache at client machine 108.

When the Kerberos authentication of connection broker 137 is successful, system service 113 verifies the identity of connection broker 137 as the second part of connection broker authentication. The verification involves determining whether connection broker 137 is listed as a machine to which credential delegation is supported. In the example where Windows operating system is used, the group policy object (GPO), which is maintained and updated by the administrator, is examined for this information. By employing this second part, a malicious machine, otherwise properly registered with domain controller 135, is not able to get access to the user's credentials. In an alternative embodiment, the GPO is checked at the beginning of step 320 rather than after the Kerberos authentication of connection broker 137.

If it is determined at step 321 that connection broker 137 is successfully authenticated, connection broker 137 is granted a Kerberos service ticket to system service 113 and system service 113 transmits the user credentials to connection broker 137 at step 322. It should be recognized that the transmitted user credentials are encrypted using the session key contained in the service ticket and therefore cannot be decrypted by VDI client 110 or any applications running on client machine 108 other than system service 113. Upon receipt, connection broker 137 decrypts the user credentials using the session key contained in the service ticket. At step 323, the user is prompted to select a desktop. In some embodiments, the desktop selection for a user may be automatic based on a default user setting. After this selection, connection broker 137 communicates with the virtual machine that is hosting the user's selected desktop (which is assumed here to be virtual machine 165) to log the user into that virtual machine. At step 324, connection broker 137 re-encrypts the user credentials using a key that can be decrypted only by virtual machine 165 (in particular, an endpoint system service running in virtual machine 165) and forwards the re-encrypted user credentials to virtual machine 165. At step 326, virtual machine 165 receives the re-encrypted user credentials from connection broker 137 and, upon decrypting them and using a custom login module, automatically logs in the user. It should be recognized that, because the user credentials, including the password, were forwarded to virtual machine 165 by connection broker 137, the user did not have to re-enter his or her credentials when connecting to virtual machine 165.

Returning to step 321, if it is determined that authentication of connection broker 137 was not successful, single sign-on is disabled at step 330 and the user is prompted to provide his or her user ID and password. After the user enters his or her user ID and password, steps 323, 324, and 326 are carried out to sign the user into virtual machine 165.

Figure 4:
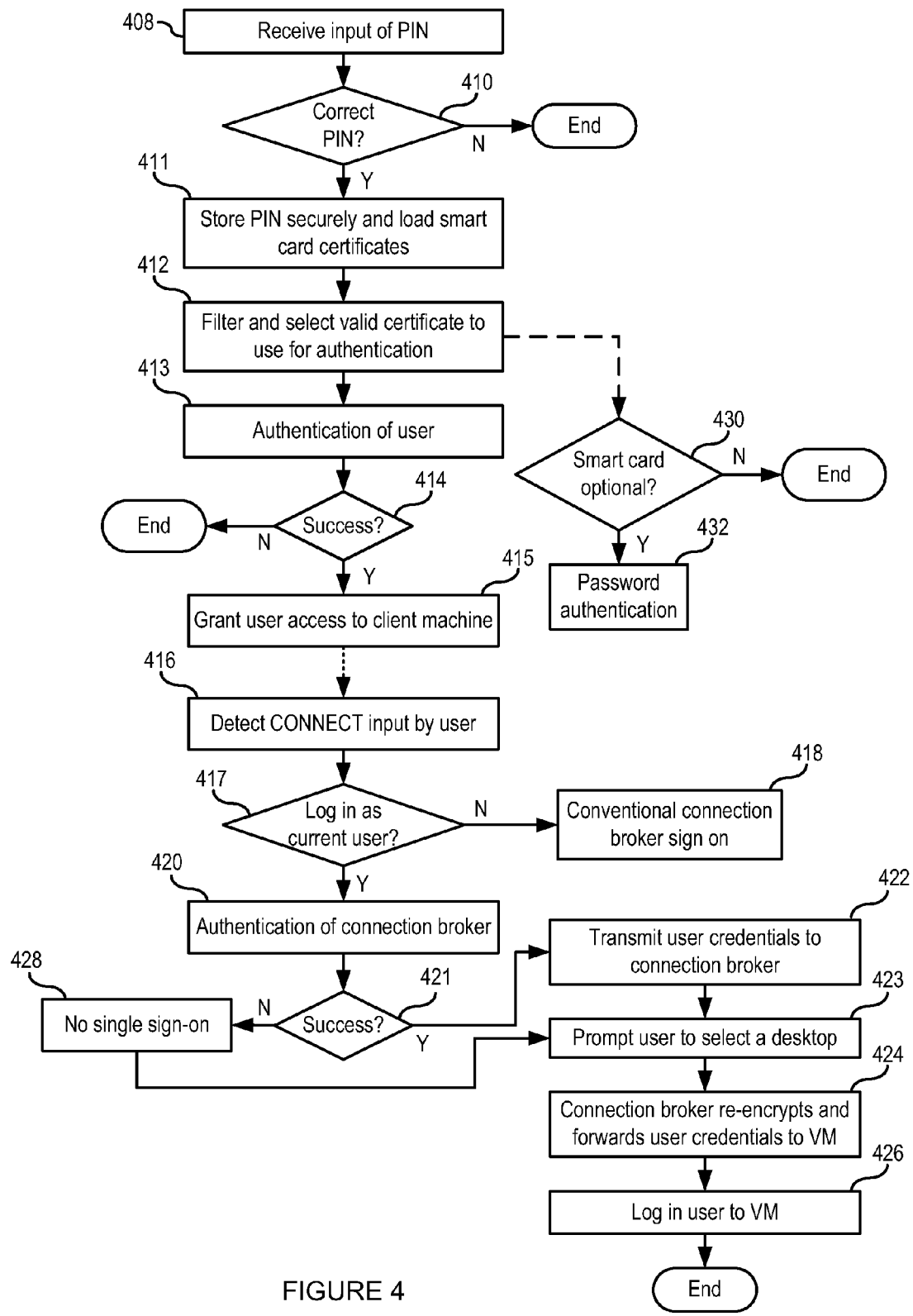
FIG. 4 is a flow diagram that illustrates a single sign-on authentication process according to one or more embodiments of the present invention when user credentials are in the form of a smart card PIN and smart card certificates.

FIG. 4 is a flow diagram that illustrates an SSO authentication process according to one or more embodiments of the present invention when user credentials are in the form of a smart card PIN and a smart card certificate. The steps herein are carried out by various components of VDI system 100, including VDI client 110, domain controller 135, connection broker 137, and virtual machine 165. In addition, smart card reader 109 is shared between VDI client 110 and virtual machine 165 using a smart card reader emulation software in virtual machine 165 to enable single sign-on. When smart card reader 109 is redirected to virtual machine 165, the smart card reader emulation software checks to see if a smart card is already inserted in smart card reader 109 and, if it is, emulates a smart card insertion event at virtual machine 165.

The SSO authentication process is initiated when the user inserts a smart card into smart card reader 109 and enters a smart card PIN to log into client machine 108. At step 408, client machine 108 receives the input of the smart card PIN. If it is determined at step 410 that the correct PIN has been entered, authentication module 112, at step 411, stores the PIN securely and loads one or more certificates stored in the smart card into client machine 108. Then, at step 412, system service 113 filters the certificates, removing any certificates that are expired, or otherwise not relevant. In one embodiment, if the filtering produces only one valid certificate, then that certificate is automatically used for smart card authentication. If, even after the filtering, multiple valid certificates remain, then a prompt is displayed allowing the user to select a certificate. If there are no valid certificates (as indicated by dotted arrow) and the smart card authentication was set to optional (step 430), normal password authentication described above in conjunction with FIG. 3 is used at step 432. Also, if it is determined at step 410 that an incorrect PIN has been entered, the user is denied access to client machine 108 and the process ends.

Step 413 represents authentication of the user performed by domain controller 135 using a valid smart card certificate, which may be the only valid smart card certificate remaining after the filtering at step 412 or a smart card certificate selected by the user. If domain controller 135 determines at step 414 that the smart card certificate is proper, i.e., digitally signed by a trusted party, the user is authenticated by domain controller 135 and associated with the user ID identified on the certificate. At step 415, user access to client machine 108 is granted.

The remaining steps shown in FIG. 4 represent the steps carried out after the user has successfully logged into client machine 108, launches VDI client 110, and clicks on "CONNECT." At step 416, VDI client 110 detects that the user has clicked on "CONNECT." Then, prior to connecting to connection broker 137, VDI client 110 determines at step 417 whether or not the user has selected the option of "Log in as current user" by checking checkbox 222. If the user has not, the user logs into connection broker 137 using conventional methods (step 418).

If VDI client 110 determines at step 417 that the user has selected the option of "Log in as current user" by checking checkbox 222, step 420 is carried out. Step 420 represents authentication of connection broker 137 and is carried out in the same manner as described above in step 320. If connection broker 137 is successfully authenticated, as determined at step 421, connection broker 137 is granted a Kerberos service ticket to system service 113 and system service 113 transmits the user credentials including the smart card PIN to connection broker 137 at step 422. It should be recognized that the transmitted user credentials are encrypted using the session key contained in the service ticket and therefore cannot be decrypted by VDI client 110 or any applications running on client machine 108 other than system service 113. Upon receipt, connection broker 137 decrypts the user credentials using the session key contained in the service ticket. At step 423, the user is prompted to select a desktop. In some embodiments, the desktop selection for a user may be automatic based on a default user setting. After this selection, connection broker 137 communicates with the virtual machine that is hosting the user's selected desktop (which is assumed here to be virtual machine 165) to log the user into that virtual machine. At step 424, re-encrypts the user credentials using a key that can be decrypted only by virtual machine 165 (in particular, an endpoint system service running in virtual machine 165) and forwards the re-encrypted user credentials to virtual machine 165. At step 426, virtual machine 165 receives the re-encrypted user credentials from connection broker 137 and, upon decrypting them and using a custom login module, enters the smart card PIN, in response to which smart card certificates stored in the smart card inserted in smart card reader 109 are retrieved as directed by the smart card reader emulation software and used to automatically log in the user to virtual machine 165. It should be recognized that, because the user credentials including the smart card PIN were forwarded to virtual machine 165 by connection broker 137, the user did not have to re-enter the smart card PIN when connecting to virtual machine 165.

Returning to step 421, if it is determined that authentication of connection broker 137 was not successful, single sign-on is disabled at step 428 and the user is prompted to provide his or her smart card PIN. After the user enters his or her smart card PIN, steps 423, 424, and 426 are carried out to sign the user into virtual machine 165.

In some embodiments, an administrator may disable smart card single sign-on. Possible reasons for doing this would be that the smart card provider already allows for remote single sign-on using PIN cache redirection or that the administrator is simply uneasy with storing the user's PIN in memory, even if the PIN is encrypted. Furthermore, in some embodiments where the user has selected the option to "Log in as current user" and the user wants to establish a new connection to a remote desktop, user credentials that were previously used for authenticating a prior connection to a remote desktop are discarded by clearing the cache in which connection broker 137 has stored the user credentials. This ensures that updated user credentials are used if the user changes them while VDI client 110 is running.

As used herein, a "connection broker" is any apparatus that is configured to manage connections to remote user sessions such as remote desktops, and a "domain controller" is any apparatus that is configured to have access to and manage user log-in information.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization.

The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of authenticating a user to a service in a system having a connection broker that manages connections to the service, comprising:
   receiving an input of credentials of the user at a client computing device that communicates with the connection broker and the service over a network, the user credentials including a secret component;
   authenticating the user to grant access to the client computing device upon successful authentication of the user;
   securely storing the secret component of the user credentials in the client computing device;
   authenticating the connection broker to a client process which runs in the client computing device and has access to the stored secret component of the user credentials;
   responsive to successful authentication of the connection broker to the client process, transmitting the stored secret component of the user credentials via the client process from the client computing device to the authenticated connection broker in a secure manner;
   responsive to receiving the secret component of the user credentials at the authenticated connection broker, forwarding the received secret component of the user credentials from the authenticated connection broker to the service; and
   at the service, authenticating the user using the secret component of the user credentials forwarded by the authenticated connection broker,
   wherein the connection broker is authenticated to the client process and the stored secret component of the user credentials is transmitted to the authenticated connection broker responsive to the user selecting to use the same credentials used to access the client computing device to also access the service.

2. The method of claim 1, wherein the secret component of the user credentials is stored in an internal cache of the client computing device that can be accessed by the client process but cannot be accessed by user-level processes running in the client computing device.

3. The method of claim 1, wherein the secret component of the user credentials transmitted via the client process to the authenticated connection broker is encrypted, and wherein the authenticated connection broker decrypts and re-encrypts the secret component of the user credentials such that only the service can decrypt the re-encrypted secret component of the user credentials.

4. The method of claim 1, wherein authenticating the connection broker to the client process includes performing Kerberos authentication using an ID of the connection broker registered with a domain controller.

5. The method of claim 4, wherein authenticating the connection broker to the client process further includes determining whether credential delegation to the connection broker is supported.

6. The method of claim 1, wherein either the user credentials include a user ID and a password, and the password is the secret component, or the user credentials include a certificate stored in a smart card and a PIN to access the certificate, and the PIN is the secret component.

7. The method of claim 1, wherein a domain controller that manages user accounts communicates with the client computing device and performs Kerberos authentication to authenticate the user prior to granting access to the client computing device.

8. The method of claim 1, wherein the service runs on one of a plurality of resources managed by the connection broker.

9. The method of claim 8, wherein the resources are virtual machines.

10. A non-transitory computer-readable storage medium containing a program which, when executed by one or more processors, performs operations for managing connections to a service using a connection broker, the operations comprising:
    receiving an input of credentials of the user at a client computing device that communicates with the connection broker and the service over a network, the user credentials including a secret component;
    authenticating the user to grant access to the client computing device upon successful authentication of the user;
    securely storing the secret component of the user credentials in the client computing device;
    authenticating the connection broker to a client process which runs in the client computing device and has access to the stored secret component of the user credentials;
    responsive to successful authentication of the connection broker to the client process, transmitting the stored secret component of the user credentials via the client process from the client computing device to the authenticated connection broker in a secure manner;
    responsive to receiving the secret component of the user credentials at the authenticated connection broker, forwarding the received secret component of the user credentials from the authenticated connection broker to the service; and
    at the service, authenticating the user using the secret component of the user credentials forwarded by the authenticated connection broker,
    wherein the connection broker is authenticated to the client process and the stored secret component of the user credentials is transmitted to the authenticated connection broker responsive to the user selecting to use the same credentials used to access the client computing device to also access the service.

11. The non-transitory computer-readable storage medium of claim 10, wherein the secret component of the user credentials is stored in an internal cache of the client computing device that can be accessed by the client process but cannot be accessed by user-level processes running in the client computing device.

12. The non-transitory computer-readable storage medium of claim 10, wherein the secret component of the user credentials transmitted via the client process to the authenticated connection broker is encrypted, and wherein the authenticated connection broker decrypts and re-encrypts the secret component of the user credentials such that only the service can decrypt the re-encrypted secret component of the user credentials.

13. The non-transitory computer-readable storage medium of claim 10, wherein authenticating the connection broker to the client process includes performing Kerberos authentication using an ID of the connection broker registered with a domain controller.

14. The non-transitory computer-readable storage medium of claim 13, wherein authenticating the connection broker to the client process further includes determining whether credential delegation to the connection broker is supported.

15. The non-transitory computer-readable storage medium of claim 10, wherein either the user credentials include a user ID and a password, and the password is the secret component, or the user credentials include a certificate stored in a smart card and a PIN to access the certificate, and the PIN is the secret component.

16. The non-transitory computer-readable storage medium of claim 10, wherein the service runs on one of a plurality of resources managed by the connection broker.

17. The non-transitory computer-readable storage medium of claim 16, wherein the resources are virtual machines.

18. A computer system configured to support single sign-on access, comprising:

one or more server computers in which a service runs on one of a plurality of resources;

a connection broker for managing connections to the plurality of resources; and a domain controller for authenticating a user prior to granting access to a client device and authenticating the connection broker to a client process having access to a securely stored secret component of user credentials input by the user into the client device, wherein the connection broker that is authenticated to the client process is configured to receive the stored secret component of the user credentials via the client process, the secret component of the user credentials being transmitted after successful authentication of the connection broker to the client process, and to forward the received secret component of the user credentials to the service, wherein the one of the plurality of resources is configured to grant access to the user based on the secret component of the user credentials forwarded by the connection broker, and wherein the connection broker is authenticated to the client process and the stored secret component of the user credentials is transmitted to the authenticated connection broker responsive to the user selecting to use the same credentials used to access the client computing device to also access the service.

* * * * *